May 13, 1958
L. CENOTTI
2,834,510
PIE-VENDING MACHINE
Filed Dec. 20, 1956
7 Sheets-Sheet 1
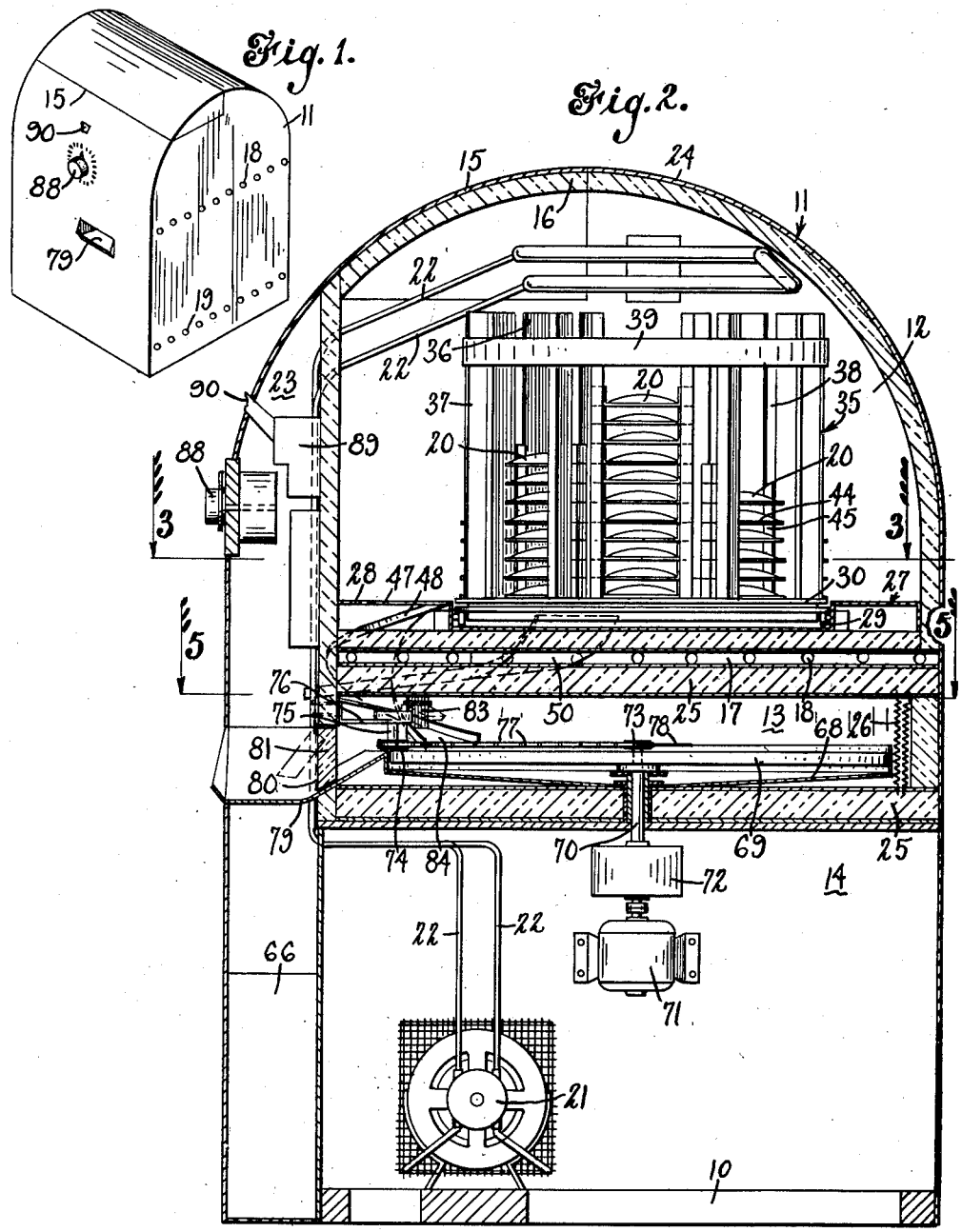
INVENTOR
Lewis Cenotti
BY Rockwell & Bartholow
ATTORNEYS May 13, 1958  L. CENOTTI  2,834,510
PIE-VENDING MACHINE
Filed Dec. 20, 1956  7 Sheets-Sheet 2

INVENTOR
Lewis Cenotti
BY Rockwell + Bartholow
ATTORNEYS

May 13, 1958

L. CENOTTI 2,834,510

PIE-VENDING MACHINE

Filed Dec. 20, 1956

INVENTOR

Lewis Cenotti

BY *Rockwell + Bartholow*

ATTORNEYS

May 13, 1958 L. CENOTTI 2,834,510
PIE-VENDING MACHINE
Filed Dec. 20, 1956 7 Sheets-Sheet 4
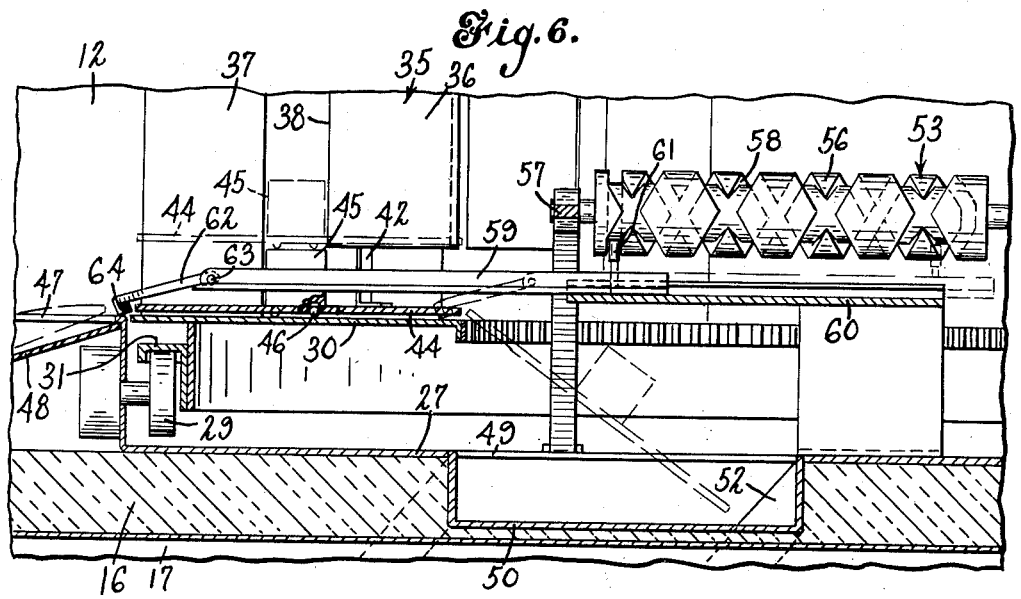
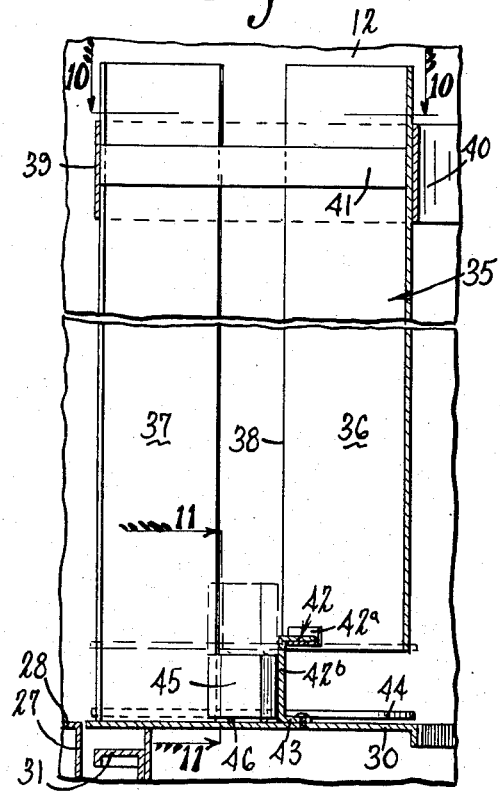
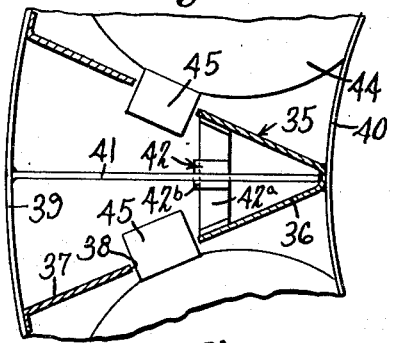
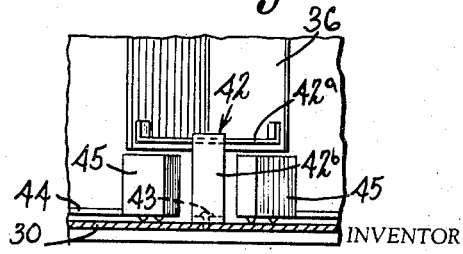
INVENTOR
Lewis Cenotti
BY Rockwell & Bartholow
ATTORNEYS May 13, 1958  L. CENOTTI  2,834,510
PIE-VENDING MACHINE
Filed Dec. 20, 1956  7 Sheets-Sheet 5

INVENTOR
Lewis Cenotti
BY Rockwell & Bartholow
ATTORNEYS

May 13, 1958 L. CENOTTI 2,834,510
PIE-VENDING MACHINE
Filed Dec. 20, 1956 7 Sheets-Sheet 6
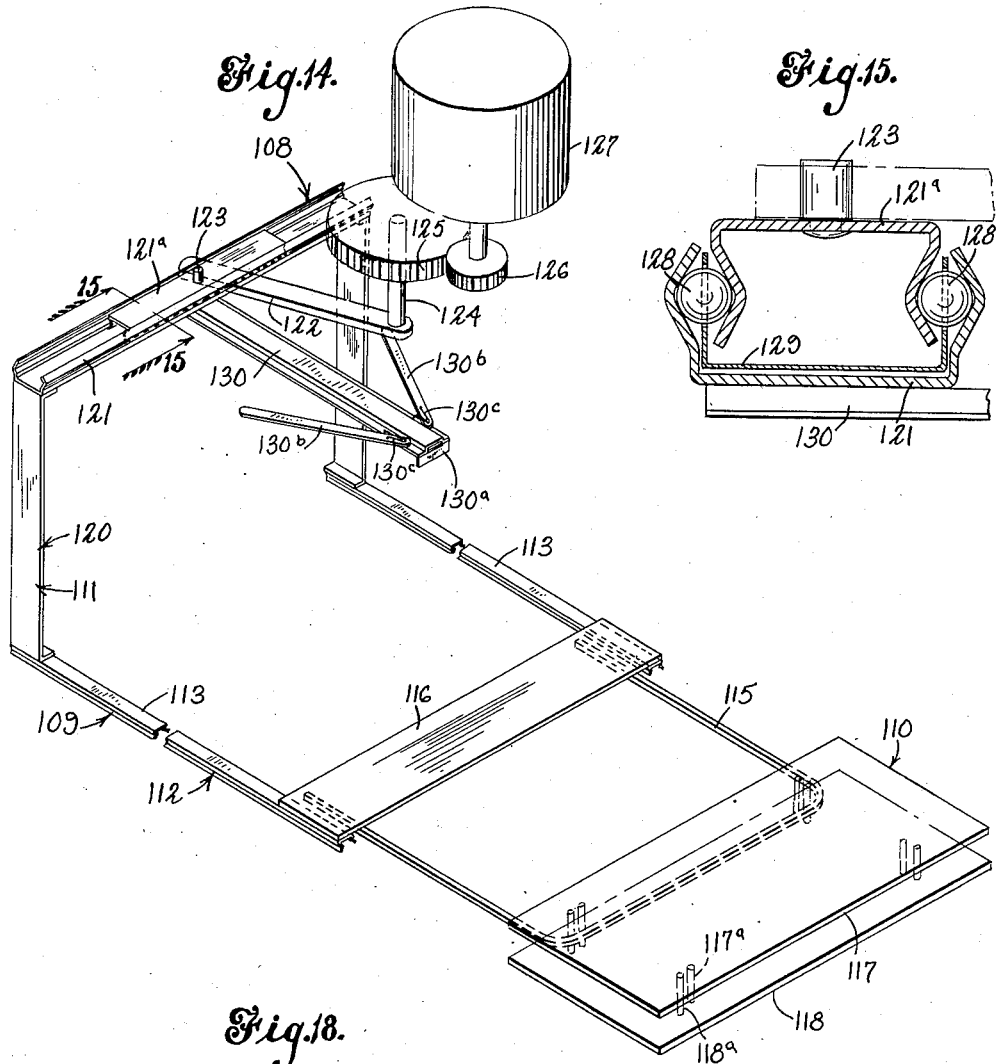
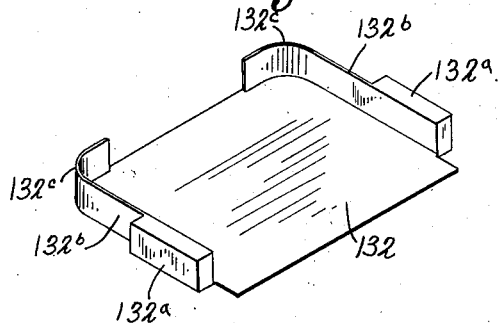
INVENTOR
Lewis Cenotti
BY Rockwell & Bartholas
ATTORNEY May 13, 1958 L. CENOTTI 2,834,510
PIE-VENDING MACHINE
Filed Dec. 20, 1956 7 Sheets-Sheet 7

INVENTOR
Lewis Cenotti
BY *Rockwell & Bartholow*
ATTORNEYS

United States Patent Office

2,834,510
Patented May 13, 1958

2,834,510

PIE-VENDING MACHINE

Lewis Cenotti, West Haven, Conn., assignor to The Pie-O-Matic Corporation, North Haven, Conn., a corporation of Connecticut Application December 20, 1956, Serial No. 629,753

13 Claims. (Cl. 221—79)

This invention relates to pie-vending machines and relates more particularly to a vending machine provided with means for storing pies under refrigeration, and also provided with means for heating pies as and when the same are ejected from the machine in an improved and efficient manner. While the invention is particularly applicable to a machine for handling pies the invention is not restricted to such an application. The instant application is a continuation-in-part of my application, Serial No. 353,597, filed May 7, 1953, now abandoned.

One object of the invention is to provide an improved vending machine of the character described above.

Another object of the invention is to provide a pie-vending machine, as above described, in which the means for storing pies under refrigeration and the means for heating pies as and when the same are ejected from the machine do not interfere with one another, though in proximity to one another.

Still another object of the invention is to provide a pie-vending machine having improved means for ejecting pies therefrom.

Other objects of the invention will be apparent from the two forms of the machine illustrated in the drawings by way of example and described in detail hereinafter.

In the drawings:

Fig. 1 is a perspective view of an upright pie-vending machine embodying the invention;

Fig. 2 is a sectional view of the pie-vending machine illustrated in Fig. 1 taken on the longitudinal median line thereof;

Fig. 6 is a broken and enlarged view generally similar to Fig. 4 and further illustrating certain parts of the machine;

Fig. 9 is an enlarged sectional view taken on line 9—9 of Fig. 3;

Fig. 10 is a sectional view taken on line 10—10 of Fig. 9;

Fig. 11 is a sectional view on line 11—11 of Fig. 9;

Fig. 14 is an enlarged perspective view illustrating a part of the pie-ejector mechanism shown in Fig. 12;

Fig. 15 is an enlarged sectional view on line 15—15 of Fig. 14;

Fig. 18 is a perspective view of one of the pie-supporting members employed in the machine illustrated in Fig. 12.

Figure 3:
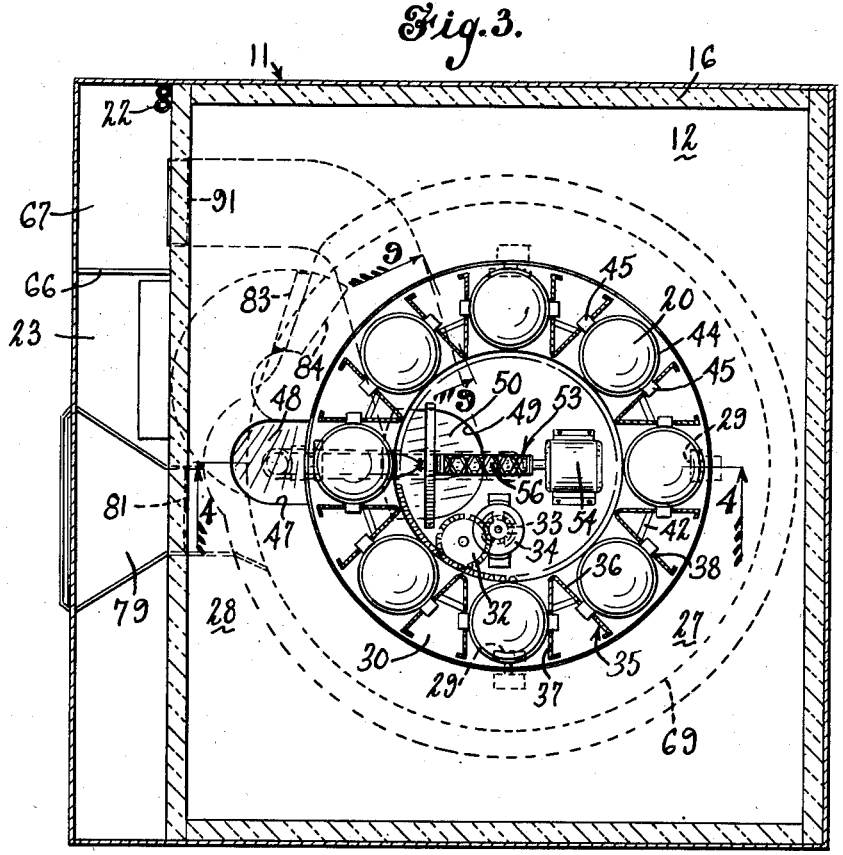
Fig. 3 is a sectional view taken on line 3—3 of Fig. 2.

In the form shown in Figs. 1 through 11, the numeral 10 generally designates the base of the machine supporting an upright housing 11 having an upper compartment 12, an intermediate compartment 13, and a lower compartment 14. The compartment 12 is provided with a suitable closure member, as indicated at 15, and is lined interiorly with suitable insulation material indicated at 16. As illustrated in Fig. 2 of the drawings, for example, the housing 11 may provide an air space 17 between the upper compartment 12 and the intermediate compartment 13 and communicating with a plurality of perforations 18 formed in the side wall structure of the housing 11. The side wall structure of the housing 11 may be provided with perforations 19 communicating with the lower compartment 14 and permitting ventilation of the latter. The upper compartment 12 provides a storage place for pies 20 or other articles of food and is refrigerated by a refrigeration unit which may be of conventional form including a motor 21 located in the lower compartment 14, and suitable refrigerant conduits 22 led through the upper compartment 12 and led through a forward compartment 23 provided in the housing 11 externally of the compartments 12, 13 and 14 and extending the width and height of the front portion of the housing 11. The housing 11 may be conveniently formed of sheet metal and, as illustrated in Figs. 1 and 2 of the drawings, the base portion of the housing 11 is rectangular. As illustrated, the housing 11 is symmetrical and is provided with a gently rounded top indicated at 24.

The aforementioned intermediate compartment 13 provided in the housing 11 provides a heating chamber for pies passed to the latter from the storage compartment 12 in a manner to be described hereinafter, and to this end, the heating chamber is lined with suitable material 25 for retaining heat therein. Interiorly of the heating chamber or intermediate compartment 13, there may be provided conventional electrical heating means of the type including heating coils, as indicated at 26. As illustrated in Fig. 2 of the drawings, the heating chamber or intermediate compartment 13 is of relatively shallow depth to conserve space and electrical energy required to heat the chamber.

Figure 4:
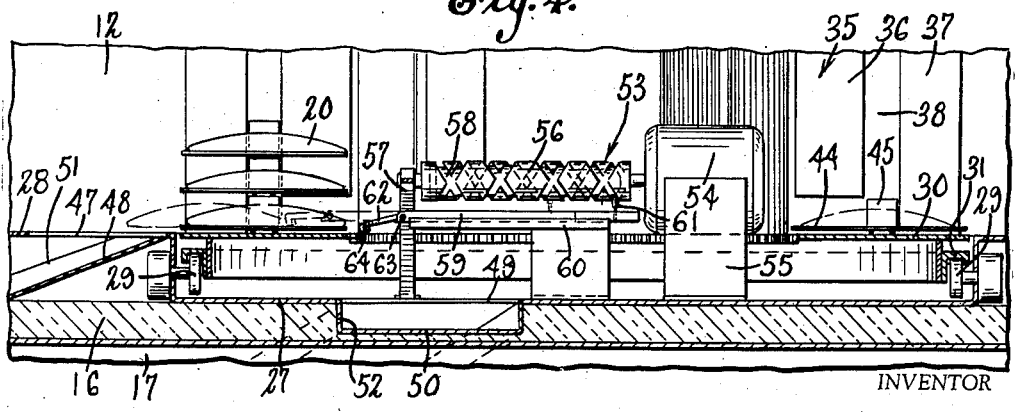
Fig. 4 is a broken and enlarged sectional view taken on line 4—4 of Fig. 3.

As illustrated in Fig. 2 of the drawings, for example, a plate indicated generally at 27 is suitably supported over the insulation material 16 covering the bottom of the upper compartment 12, the plate 27 being provided with an annular flange 28 supporting a plurality of rollers 29 arranged inwardly and circumferentially of the flange 28, in turn supporting an annular pie-supporting member 30 for rotary movement as by a flange 31 provided on the latter, as illustrated in Fig. 6, for example. The annular pie-supporting member 30 is provided interiorly and circumferentially thereof with gear teeth meshing with a gear 32, in turn meshing with a pinion 33 driven from an electric motor 34, as illustrated in Fig. 3 of the drawings, for example, the arrangement being such that the annular pie-supporting member 30 is driven from the electric motor 34. As illustrated, a plurality of elongated, upright frame members 35 are arranged circumferentially of the annular pie-supporting member 30 on the upper surface thereof, the frame members 35 being V-shaped in cross section, as illustrated in Fig. 3 of the drawings, for example, and the frame members 35 being spaced apart from one another on the annular pie-supporting member 30 and being arranged so that each side of each frame member 35 is in parallel relationship to the adjacent side of the next frame member 35. The sides of each frame member 35 comprise two inner converging parts 36 which are identical and integral with each other and two outer parts 37 converging toward each other. Each inner part 36 and each corresponding outer part 37 are spaced apart and define a longitudinal slot 38 therebetween. Each outer part 37 may have the lower end thereof secured to the annular pie-supporting member 30, as by welding. As illustrated in Fig. 4 of the drawings, for example, the lower end of each inner part 36 terminates short of the annular pie-supporting member 30 and is supported in a manner which will be described hereinafter. One or more sheet metal bands 39, one being illustrated, may embrace all of the outer parts 37 of the frame members 35 and may be welded to the outer parts 37 to provide additional support for the last-named parts.

As illustrated in Fig. 9 of the drawings, a sheet metal band 40, located in the same horizontal plane as the band 39, is suitably secured to all of the inner parts 36 of the frame members 35 and is secured to the band 39 as by metal straps 41 rigidly interconnecting the bands 39 and 40, the straps 41 being welded to the bands 39 and 40, the arrangement being such that the inner parts 36 of the frame members 35 are supported from the outer parts 37 of the frame members 35. For additional support, each frame member 35 may be provided with a T-shaped bracket 42 having a horizontally disposed crosspiece 42ª extending between and welded to the respective parts 36 adjacent the lower ends thereof, and having the leg 42ᵇ thereof secured to the annular pie-supporting member 30 as indicated at 43.

As illustrated in Figs. 2 and 3 of the drawings, for example, columns of pies 20 are supported on the annular pie-supporting member 30, each column of pies 20 being supported between two adjacent frame members 35. Each pie 20 is supported on a disk-like holder 44 having diametrically opposite lugs 45 rectangular in cross section and extending into the respective longitudinal slots 38 formed in the adjacent frame members 35, as illustrated particularly in Fig. 6 of the drawings. Each lug 45 is provided with a pair of depending and spaced apart antifriction members 46, each member being in the form of a ball adapted to engage the upper surface of the next lower lug 45, the arrangement being such that each pie 20 is supported in spaced relationship to the next higher pie holder 44. The anti-friction members 46 of the lowermost pie holders 44 engage the upper surface of the annular pie-supporting member 30. As illustrated in Fig. 4 of the drawings, for example, the annular pie-supporting member 30 is located inwardly and closely adjacent to the annular flange 28 with the upper surface thereof substantially flush with the upper surface of the annular flange 28. The annular flange 28 is cut away as at 47 closely adjacent the annular pie-supporting member 30, and a curved pie chute 48 is provided extending into the intermediate compartment 13 of the housing 11 and having the upper end thereof secured to the annular flange 28 directly below the cut-away portion 47, as by welding. The plate 27 in the upper compartment 12 of the housing 11 is provided with an aperture 49 extending inwardly beyond the inner edge of the annular pie-supporting member 30 and a chute 50 is provided for pie holders 44, extending through the bottom of the compartment 13 and extending into the compartment 23 of the housing 11, the chute 50 having the upper end thereof located below the aperture 49 and secured to the plate 27, as by welding. The chutes 48 and 50 may be formed of sheet metal and may have upright side edges as indicated at 51 and 52, respectively, serving as guide rails.

As illustrated in Figs. 3, 4 and 6, for example, an ejector mechanism, indicated generally at 53, is located inwardly of the annular pie-supporting member 30. The ejector mechanism 53 comprises an electric motor 54 supported by brackets 55 suitably secured to the plate 27. The shaft of the electric motor 54 is connected directly and rigidly to a horizontally disposed cam shaft 56 having the outer end thereof journalled in a bracket 57, suitably secured to the plate 27. The cam shaft 56 extends diametrically of the annular pie-supporting member 30 and is provided with an endless helical groove 58. A slide 59 extending longitudinally of the cam shaft 56 and located under the latter is disposed in a guide 60 suitably secured to the plate 27, and the slide 59 is provided with a finger 61 extending into the endless helical groove 58 of the cam shaft 56 to impart reciprocating and rectilinear movement to the slide 59 upon rotation of the cam shaft 56 by the motor 54. The slide 59 is provided with a flange 62 pivoted to the slide 59 on a horizontal pivot 63 disposed transversely of the outermost end thereof, the flange 62 having a downwardly and inwardly inclined outer edge portion 64. The normal or inoperative position of the flange 62 is illustrated in full lines in Fig. 4 of the drawings and, in this position, the outermost edge portion 64 of the flange rests on the inner edge portion of the annular pie-supporting member 30. When the slide 59 is moved outwardly by the cam shaft 56, as indicated in broken lines in Fig. 4 of the drawings, the flange 62 rides over the lowermost pie holder 44, the outermost edge portion 64 of the flange pushing the pie thereon outwardly and depositing the same on the chute 48 through the cut-away portion 47 of the annular flange 28. The fully extended position of the flange 62 is illustrated in Fig. 6 of the drawings. The pie 20 then slides down the chute 48 to the intermediate chamber 13 of the housing 11. When the flange 62 is moved inwardly by the cam shaft 56, the outermost downwardly-and-inwardly inclined edge portion 64 engages the edge of the pie holder 44 and moves the same inwardly to drop the latter on the chute 50 through the aperture 49 formed in the plate 27, as illustrated in broken lines in Fig. 6 of the drawings. The pie holder 44 then slides by gravity to the forward compartment 23 of the housing on the chute 50. The forward compartment 23 of the housing 11 may be provided with an upright partition member 66 providing a collection chamber 67 for pie holders 44 directly below the lower end of the chute 50, the chamber 67 being located in one corner of the housing 11, as illustrated in Fig. 3 of the drawings, for example.

Figure 5:
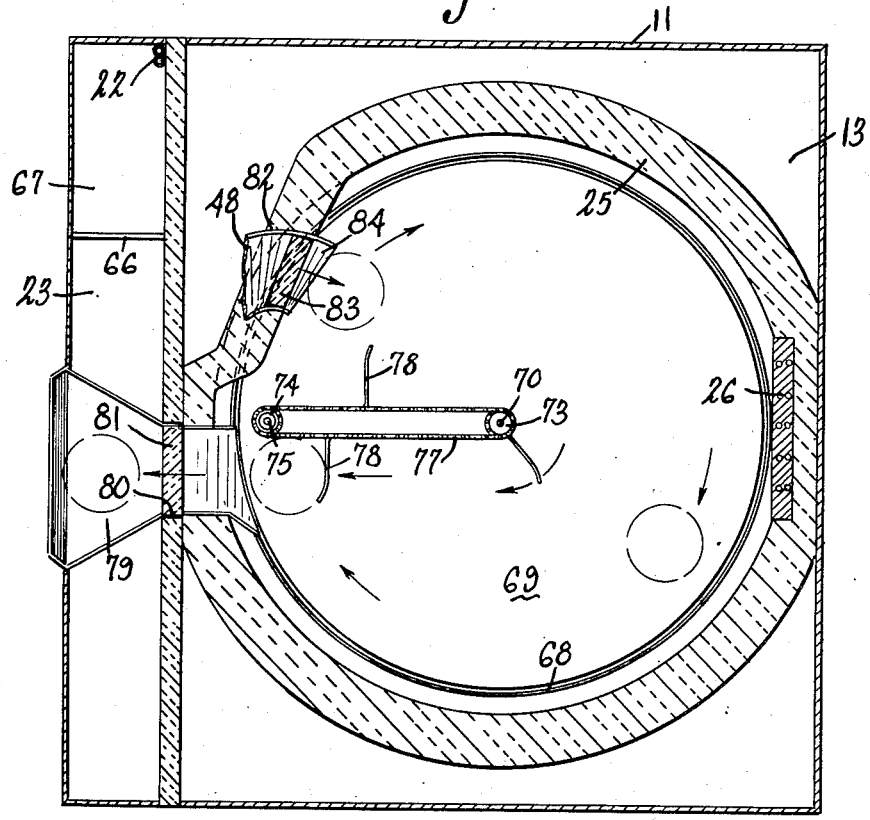
Fig. 5 is a sectional view taken on line 5—5 of Fig. 2.
Figure 7:
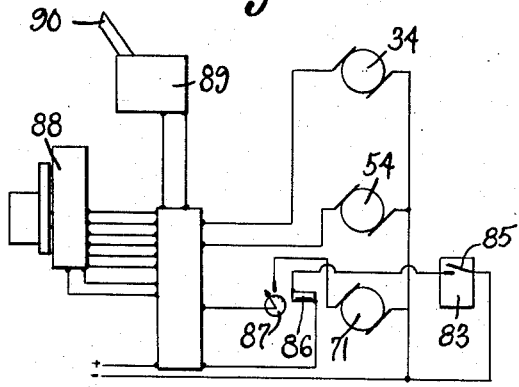
Fig. 7 is a view illustrating diagrammatically the wiring circuits of the machine.
Figure 8:
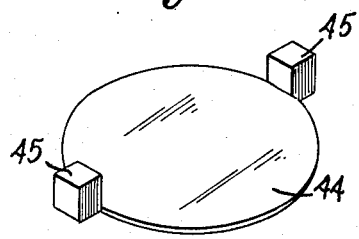
Fig. 8 is a perspective view illustrating one of the pie holders used in connection with the machine.
Figure 12:
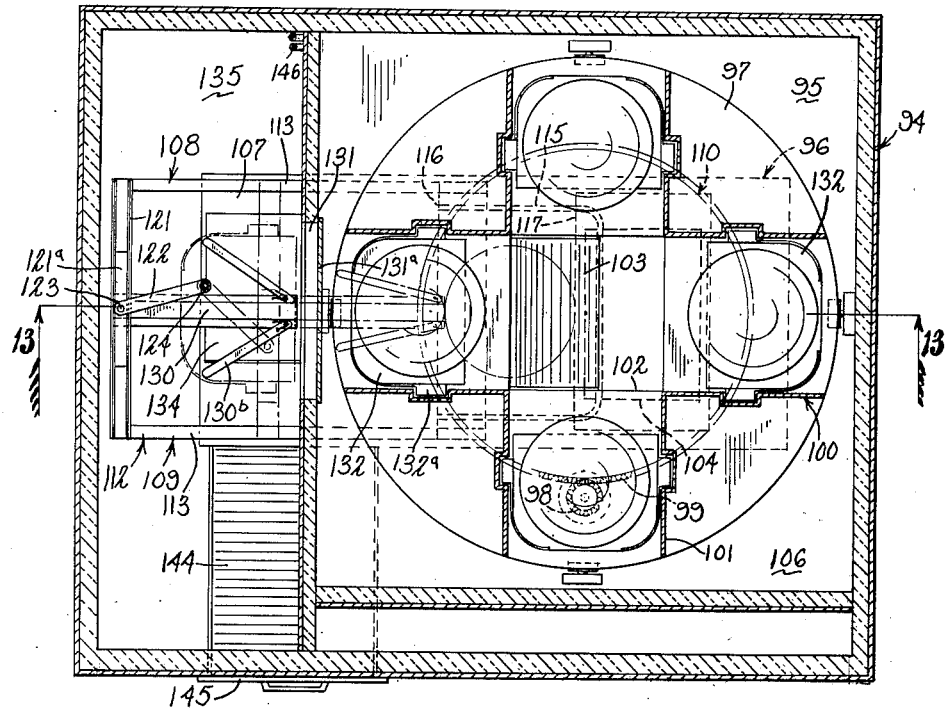
Fig. 12 is a view generally similar to Fig. 3 and illustrating a modified form of the invention.

As illustrated in Fig. 2 of the drawings, a dished member 68 preferably formed of sheet metal is located in the intermediate compartment 13 provided in the housing 11 and suitably supported from the bottom of the compartment 13, the dished member 68 being round. A turntable 69 having a circumference only slightly less than the internal circumference of the dished member 68 is located in the latter a distance below the upper edge of the dished member 68, and is driven from a shaft 70 extending through the bottom of the intermediate compartment 13, the shaft 70 being driven from an electric motor 71 located in the lower compartment 14 of the housing 11 and suitably mounted therein. The shaft 70 is driven from the motor 71 through a conventional gear-reduction mechanism indicated generally at 72, so that the turntable 69 is rotated preferably at the rate of one revolution every 90 seconds. The shaft 70 extends upwardly through the turntable 69 and carries a sprocket wheel 73 at the upper end thereof and fixed thereto. An idler in the form of a sprocket wheel 74 is carried by a vertical stub shaft 75 supported from a bracket 76 suitably secured to the side wall structure of the intermediate compartment 13, and an endless link belt 77 is trained over the sprocket wheels 73 and 74. The endless link belt 77 carries a plurality of outwardly extending sweep members suitably secured thereto and indicated at 78 in Fig. 5 of the drawings, for example. A chute 79 extends through the foremost portion of the housing 11 and is inclined downwardly from the edge of the turntable 69. The chute 79 is located to one side of the sprocket wheel 74 and adjacent thereto, as illustrated in Fig. 5 of the drawings, for example. As illustrated in Fig. 2 of the drawings, the chute 79 may be formed integrally with the dished member 68 in which the turntable 69 is disposed. The chute 79 extends through an opening 80 formed in the side wall structure of the compartment 13, the latter being provided with a closure member 81 mounted at the upper edge thereof for swinging movement on a horizontal axis and normally retained in closed position by gravity, to inhibit escape of heat from the compartment 13. The pie chute 48 also extends through the side wall structure of the compartment 13, the chute 48 extending through an opening 82 therein normally closed by a closure member 83 similar to the closure member 81. The chute 48 terminates over the edge portion of the turntable 69 as at 84. As illustrated in Fig. 5 of the drawings, the turntable 69 is rotated in a clockwise direction and the lower end 84 of the chute 48 is located laterally of the chute 79 generally in the direction of rotation of the turntable 69, the idler or sprocket wheel 74 being located intermediate the lower end 84 of the chute 48 and the inner end of the chute 79.

A pie deposited on the chute 48 by the ejector mechanism 53 moves down the chute 48 by gravity, opening the closure member 83, and thereby actuating a conventional mercury switch 85 to close a circuit energizing a solenoid 86, in turn actuating a timer 87 starting the motor 71 to rotate the turntable 69. The pie is deposited on the turntable 69 by gravity adjacent the lower end 84 of the chute 48. The pie is then carried by the turntable 69 to a position adjacent the chute 79 and the endless belt 77, as indicated in broken lines in Fig. 5 of the drawings, from which position the pie is swept onto the chute 79 by one of the sweeps 78 carried by the endless belt 77. The pie then moves down the chute 79 by gravity, opening the closure member 81, and comes to rest on the chute 79 in a position indicated by broken lines in Fig. 5 of the drawings. The pie may then be removed manually from the machine in hot condition, the pie having been thoroughly heated as it passes through the intermediate compartment or heating chamber 13. The temperature of the heating chamber is preferably maintained at 450° F. by means of a conventional thermostatic regulator. The motor 71 is cut off by the timer 87 after the pie is discharged from the heating chamber.

In accordance with the foregoing disclosure, the annular pie-supporting member 30 and the frame members 35 thereon provide a rack supporting pies arranged in columns, disposed circumferentially of the rack, the pies in each column being individually supported on holders 44 fed toward the annular supporting member 30 by gravity. Preferably the pies on the rack are arranged in columns according to their ingredients, each pie in one column having the same ingredients, and the pies of one column having different ingredients from the pies of every other column. A conventional selector mechanism indicated generally at 88 may actuate the motor 34 so that the columns of pies may be selectively positioned adjacent the pie chute 48, the annular supporting member 30 being rotatable and having an operative connection with the motor 34, as described above. A conventional electrical coin-operated unit, indicated generally at 89, and having a coin chute 90 extending outwardly from the housing 11 may actuate the motor 54 of the ejector mechanism 53 to eject a pie and the holder 44 therefor, in the manner described above, the arrangement being such that a pie may be discharged from the machine in return for each coin deposited in the coin chute 90.

It may be noted that in the operation of the vending machine, a plurality of pies may be disposed on the turntable 69 in the heating chamber in laterally spaced relationship at the same time, the arrangement being such that the interval between the discharge of two or more pies on the exit chute 79 may be less than the time required for the turntable 69 to complete one full revolution. It will be understood that the interval between the discharge of two or more pies will be dependent upon the rapidity with which the ejector mechanism is actuated by the coin-operated unit.

In accordance with the foregoing disclosure, pies may be supported one above another in a gravity-feed rack including the annular supporting member 30 and frame members 35, without any danger of the pies being crushed. Furthermore, angular movement of the pies in the rack is prevented by the lugs 45 rectangular in cross section provided on the pie holders 44 and extending into the slots 38 defined by the frame members 35, the lugs 45 being received in the slots 38 with small lateral clearance. As illustrated in Figs. 3 and 6 of the drawings, outward movement of the lowermost holders 44 is prevented owing to the opposing relationship of the lugs 45 with respect to the inner edges of the respective outer parts 37 of the frame members 35. However, the lowermost holders 44 may be moved inwardly to the chute 50, as described above, the lugs 45 passing under the crosspieces 42ª of the T-shaped brackets 42, the anti-friction members 46 depending from the lugs 45, facilitating inward movement of the holders. The pie-holder chute 50, as pointed out above, extends between the refrigerated compartment 12 and the forward compartment 23 provided by the housing. The invention contemplates the provision of a refrigerated compartment in which pies may be kept without deterioration for a period of more than a week, and to this end, a closure member 91, similar to the closure member 81, may be provided between the compartment 12 and the compartment 23 and associated with the chute 50 to facilitate the retention of the proper temperature in the refrigerated compartment 12.

Figure 13:
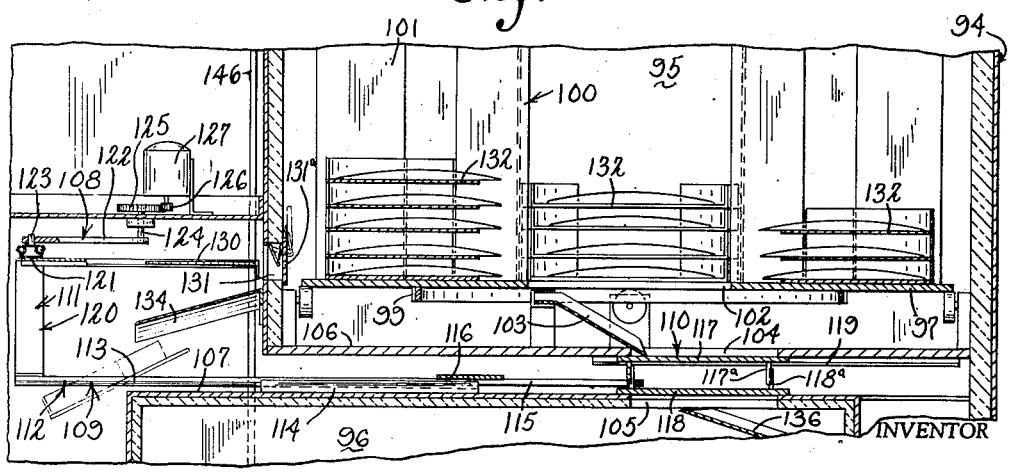
Fig. 13 is an enlarged sectional view taken on line 13—13 of Fig. 12.
Figure 16:
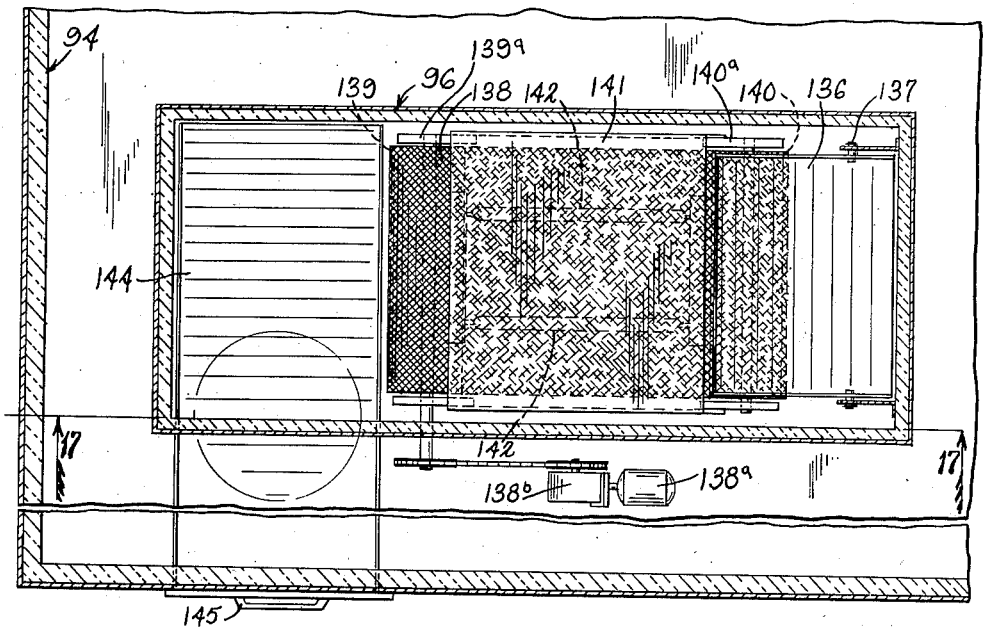
Fig. 16 is an enlarged fragmentary view in horizontal section and illustrating the pie-conveying mechanism in the heating compartment of the machine illustrated in Fig. 12.
Figure 17:
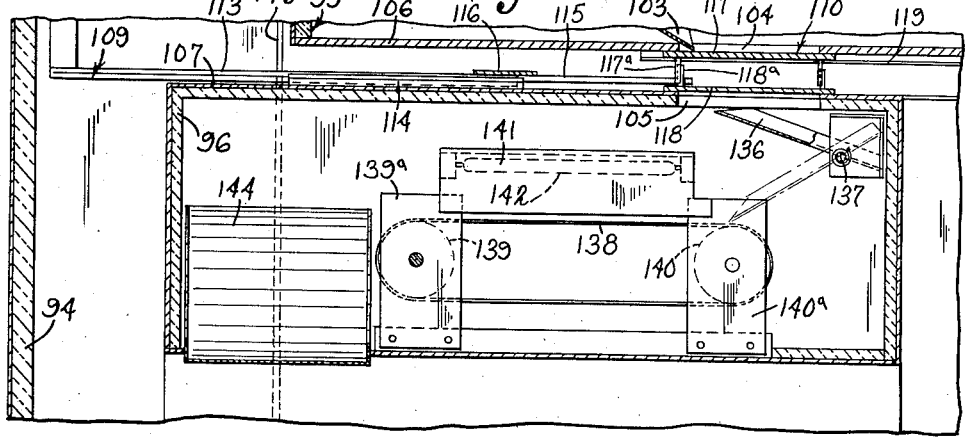
Fig. 17 is a sectional view taken on line 17—17 of Fig. 16.

The form of the pie-vending machine illustrated in Figs. 12 through 18 differs primarily in two respects from the form of the machine described above, i. e., the ejector mechanism for pies in the refrigerator compartment and the means for conveying the pies from the refrigerator compartment through the heating compartment. In the form shown in Figs. 12 through 18, the casing 94, which is generally similar to the casing of the first form, provides an upper refrigerator or storage compartment 95 and a lower heating compartment 96. The storage compartment is provided with a suitable refrigerant conduit 146 which extends from a refrigeration unit (not shown) similar to the refrigeration unit 21. In the upper or storage compartment 95 there is an annular pie-supporting member 97 generally similar to the above-described member 30, the member 97 being mounted for rotary movement in a manner similar to the above-described mounting of the member 30, and the arrangement being such that the annular member 97 may be rotated by a motor-driven gear 98 meshing with gear teeth 99 provided on the annular member 97. Supported on the annular member 97 is an upwardly extending pie rack, indicated generally at 100, and arranged circumferentially of the member 97, the pie rack being formed of members 101 similar to the upright frame members 35 described above. Below the central aperture 102 of the member 97 there is provided a fixed pie chute 103 inclined downwardly to an opening 104 formed in the bottom of the storage chamber which opening registers with an opening 105 formed in the top of the heating compartment 96, as shown in Fig. 13. As shown in the last-mentioned view, the bottom of the storage compartment 95, which is indicated at 106, is spaced upwardly from the top of the heating compartment 96, indicated at 107.

The ejector mechanism for the pies supported by the rack 100 is indicated generally at 108 and comprises a slide 109 interposed between the bottom 106 of the upper compartment and the top 107 of the lower compartment. The slide 109 is provided with a plate part 110 which, in one position of the slide, closes the openings 104 and 105. As shown in Fig. 13, the slide is L-shaped having an upwardly extending leg 111 and a horizontally extending leg 112, the leg 112 having a lost-motion connection with the plate part 110. As best shown in Fig. 14, the leg 112 of the L-shaped slide comprises a generally U-shaped element, the arms of which are formed in part by inverted channel members 113. The inverted channel members 113 ride on tracks 114 secured to the upper surface of the top 107 of the heating compartment. A bail-like member 115 is provided having the ends thereof in fixed relation to the respective members 113, the bail-like part 115 forming the base of the U. The arms of the U are braced intermediate their ends by an interconnecting plate part 116 which may be welded to the members 113 and the ends of the bail-like part 115. The bail-like part 115 extends intermediate upper and lower plates of the part 110, the upper plate being indicated at 117 and the bottom plate being indicated at 118.

The plates 117 and 118 are of oblong form and the plate 117 is of the same dimensions as the plate 118. The upper plate 117 is slidable in a track 119 suspended from the bottom 106 of the heating compartment. The lower plate 118 rests on the top 107 of the heating compartment for sliding movement on the latter. The plates 117 and 118 are vertically spaced from one another, as shown in Fig. 13, and the upper plate 117 is provided with four depending pins 117$^a$ arranged adjacent the corners of the last-mentioned plate and terminating a short distance above the lower plate 118. The lower plate 118 is provided with four pins 118$^a$ extending upwardly from the last-mentioned plate adjacent the corners thereof and terminating a short distance from the upper plate 117. The bail-like part 115 extends intermediate one pair of the pins 117$^a$ and the other pair of pins 117$^a$. The bail-like part 115 also extends intermediate one pair of the pins 118$^a$ and the other pair of pins 118$^a$. The pins 117$^a$ and 118$^a$ are of such a length that the bail-like part 115 may not slide by them and the arrangement is such that the pins 117$^a$ and 118$^a$ form a lost-motion connection between the bail-like part 115 and the plates 117 and 118. The arrangement is also such that the plates 117 and 118 tend to slide with one another as a unit when motion is imparted to them through the bail-like part 115. In the position of the slide 109 shown in Fig. 13, the upper plate 117 closes the aperture 104 while the lower plate 118 closes the aperture 105. However, when the slide is moved from the position of Fig. 13 to the right, the bail-like part 115 first moves relatively to the plates 117 and 118 and then engages the corresponding pair of pins 117$^a$ and the corresponding pair of pins 118$^a$ to move the plates 117 and 118 a distance to uncover the apertures 104 and 105 to the extent that a pie dropped on the chute 103 during the last part of the movement of the plates 117 and 118 may drop through the apertures 104 and 105.

The upwardly extending leg 111 of the L-shaped slide 109 comprises a part of inverted U shape (see Fig. 14), indicated at 120. The arms of the inverted U-shaped part 120 have their distal ends secured to the respective members 113 at their corresponding ends, as by welding. As shown in the last-mentioned view, the other ends of the arms are interconnected by a trough-shaped part 121 and an inverted channel member 121$^a$ is mounted in the trough-shaped part 121 for rectilinear sliding movement in the latter. The slide member 121$^a$, which operates the L-shaped slide 109, is in turn operated by a crank 122. The crank 122 is pivoted to the slide member 121$^a$, as at 123, and the crank has a shaft portion 124 extending concentrically into and rigid with a gear 125. The gear 125 meshes with a pinion 126 which is driven from the shaft of a motor 127. From the foregoing it will be understood that the motor-driven crank 122 imparts reciprocating motion to the L-shaped slide 109 through the slide member 121$^a$ and, to reduce friction between the slide member 121$^a$ and the trough-shaped part 121, a number of ball bearings 128 may be interposed therebetween, as shown in Fig. 15. A retainer 129 is provided for the ball bearings 128. A similar anti-friction bearing assembly (not shown) may be interposed between the inverted channel members 113 of the slide 109 and the tracks 114.

At the upper end portion of the upwardly extending leg 111 of the slide 109 there is provided a laterally projecting arm 130 extensible into the storage chamber 95 through an aperture 131 formed in the side wall structure of the latter. As best shown in Fig. 14, the distal end of the arm 130 is provided with a depending flange 130$^a$ and the other end of the arm 130 is fixed to the underside of the trough-shaped part 121 midway between the ends of the latter, as by welding. Somewhat rearwardly of the flange 130$^a$ the arm 130 is provided with a pair of fingers 130$^b$ pivoted to the respective side portions of the arm for swinging movement in a horizontal plane. The fingers 130$^b$ are inclined rearwardly from the sides of the arm 130, and springs 130$^c$ are interposed between the sides of the arm 130 and the respective fingers 130$^b$ to urge the fingers outwardly from the sides of the arm and forwardly to the positions shown in Fig. 14.

Pie holders 132 are provided to support the pies one above another in columns arranged circumferentially in the rack 100, one of the pie holders 132 being shown to advantage in Fig. 18. The pie holders 132 are generally similar to the pie holders 44 described above. Each pie holder 132 is provided with opposite lugs 132$^a$, similar in construction and purpose to the above-described lugs 45 provided on the pie holders 44, to support from below the next higher pie holder 132. The pie holders 132 are received in the rack 100 in a manner similar to the manner in which the pie holders 44 are received in the rack formed by the frame members 35. Each pie holder at the side thereof remote from the center of the rack 100 is provided with spaced apart upwardly extending flanges 132$^b$. As best shown in Fig. 18, the flanges 132$^b$, which extend from the lugs 132$^a$ and which are of approximately the same height as the lugs 132$^a$, are curved, as at 132c, to approach one another at the last-mentioned side of the holder 132. From the foregoing it will be understood that the pie rack 100 is revoluble to align any selected column of pies with the aperture 131 through which the arm 130 of the ejector mechanism is extensible. A closure member 131$^a$ is provided to close the opening 131, the member 131$^a$ being hinged to close by gravity. The arm 130 is engageable with the closure member 131$^a$ to open the latter so that the arm may extend into the storage compartment 95.

The operation of the ejector mechanism 108 is as follows. When the motor 127 is started and the ejector slide 109 is in the position of Fig. 13, the slide 109 is moved to the right (Fig. 13) through the action of the pinion 126, the gear 125, the crank 122 and the slide member 121$^a$, this movement of the slide being in a direction to engage the arm 130 with the closure member 131$^a$ to open the latter, the movement also being in a direction to move the plate-like part 110 of the slide in a direction to uncover the openings 104 and 105. As the finger-equipped arm 130 advances from the position of Fig. 13 to the broken-line position of Fig. 12, the flange 130$^a$ of the arm engages the pie supported by the lowermost holder 132 in the column aligned with the ejector arm and pushes the pie over the holder 132 in a direction toward the chute 103. As the arm 130 is moved over the bottom of the lowermost holder 132 in the last-mentioned direction, the spring-pressed fingers 130$^b$ pivoted on the arm are extended between the opposing flanges 132$^c$ of the lower holder 132. The spring-pressed fingers 130$^b$ engage the respective flanges 132$^c$ during this movement and through this engagement are swung inwardly toward the sides of the arm 130 as movement of the arm 130 in the last-mentioned direction is continued. However, when the distal ends of the fingers move past the opposing ends of the flanges 132ᵇ, the fingers 130ᵇ move outwardly away from the respective sides of the arm 130 through the action of the springs 130ᶜ, the fingers following the curved portions 132ᶜ of the respective flanges. When the fingers 130ᵇ are in their last-mentioned positions, the fingers are engaged with the flanges 132ᶜ of the lower pie holder 132 in such a way that the arm may not be retracted without moving the pie holder rearwardly with the arm. It will be understood that as the slide arm 130 is advanced or moved from the position of Fig. 13 to the right, the arm pushes the last-mentioned pie off the last-mentioned holder 132 to deposit the pie on the chute 103 while, at the same time, the part 110 of the slide is moved to uncover the apertures 104 and 105 to the extent that the pie may slip off the chute 103 through the apertures 104 and 105, the pie being dropped through the slide 109 intermediate the plate part 116 and the trough-shaped part 121.

When the slide 109 has reached the foremost position thereof permitted by the rotary crank 122, continued swinging movement of the crank effects retraction of the slide 109 to the position shown in Fig. 13 and, owing to the last-mentioned engagement of the fingers 130ᵇ with the holder 132, ejects the holder 132 from the rack 100 in a direction opposite the pie-ejecting direction, the holder passing through the opening 131. The pie holder 132 is separated from the fingers 130ᵇ by the force of gravity and falls on a chute 134 which delivers the holder to a compartment 135 in the casing.

When the pie is dropped from the chute 103 into the heating compartment 96 in the manner described above, the pie falls on a chute 136. The chute 136 is pivoted, as at 137, and is spring urged to the upwardly tipped position shown in Fig. 17. The weight of the pie on the chute 136 causes the chute to tip downwardly to the broken-line position of Fig. 17 so that the pie may slide off the chute 136 to a conveyor belt 138. The conveyor belt 138 is preferably formed of wire mesh and is supported on a roller 139 and a roller 140, the rollers 139 and 140 being mounted for rotary movement in suitable upwardly extending brackets 139ᵃ and 140ᵃ, respectively, supported from the bottom of the compartment 96. The belt 138 is driven by an electrical motor 138ᵃ drivingly connected to the roller 139 in a conventional manner including a speed-reduction unit 138ᵇ. A downwardly facing reflector 141 extends between and is supported from the brackets 139ᵃ and 140ᵃ above the upper run of the conveyor belt 138 and an electrical heating element is mounted in the reflector 141 to give off sufficient thermal energy to heat the pie on the upper run of the conveyor belt 138. In the instant form, the heating element is constituted by two infrared lamps 142. At the end of the conveyor remote from the chute 136 there is provided a chute 144 extending transversely of the conveyor to receive the pie from the upper run of the conveyor belt 138 and deliver it through the side wall structure of the heating compartment 96 to a closure member 145 permitting access into the casing to the cooked and hot pie.

In accordance with the foregoing disclosure of two forms of a vending machine, there is provided an improved vending machine, the vending machine being particularly adapted for handling pies or other articles of food. As described above, the machine incorporates means for storing articles of food under refrigeration and means for heating the articles of food as and when the same are ejected from the machine, neither means interfering with the other, though in proximity to one another. Still another advantage of the machine is the provision of an improved ejector mechanism by which an article of food and the holders therefor are separately handled in an improved manner.

While two forms of the vending machine have been illustrated in the drawings and described above, it will be apparent that the machine is susceptible of various modifications and changes without departing from the principles of the invention and the scope of the claims.

What I claim is:

1. In a machine such as described, a housing including a cooling compartment and a heating compartment below the cooling compartment, refrigerating means associated with the cooling compartment, heating means associated with the heating compartment, an annular member rotatably supported in the cooling compartment for supporting a plurality of food articles arranged circumferentially thereof, a chute adjacent the annular member for conveying the articles to the heating compartment from the cooling compartment, the annular member being rotatable to selectively position any of the food articles thereon adjacent the chute, motor-driven means including a slide for ejecting the selected food article from the annular member and depositing the selected article on the chute, means in the heating compartment to receive the article from the chute and transport the article to an exit in the heating compartment, said means in the heating compartment comprising a motor-driven article-supporting member.

2. In a machine such as described, a housing including a cooling compartment and a heating compartment below the cooling compartment, refrigerating means associated with the cooling compartment, heating means associated with the heating compartment, an annular gravity-feed rack rotatably supported in the cooling compartment and adapted to support a plurality of food articles arranged in columns disposed circumferentially thereof, plate members supporting the respective articles from below, the plate members being slidable toward the bottom of the rack by gravity, a chute having the upper end thereof radially inwardly of the rack and adjacent thereto, a chute having the upper end thereof radially outwardly of the rack and adjacent thereto, one of said chutes extending toward the heating compartment and the other extending toward a collection chamber formed by the housing, said rack being rotatable to selectively position any column of food articles thereon between and adjacent the upper ends of said chutes, means associated with the cooling compartment for ejecting the lowermost food article and plate member therefor in the selected column, the last-mentioned means ejecting the food article to the chute extending toward the heating compartment and ejecting the plate member to the chute extending toward the collection chamber, and means in the heating compartment to receive the food article from the chute therefor and transport the article to an exit in the heating compartment, the last-mentioned means comprising a motor-driven article-supporting member.

3. In a machine such as described, a housing including a cooling compartment and a heating compartment, refrigerating means associated with the cooling compartment, heating means associated with the heating compartment, supporting means for a plurality of food articles rotatably mounted in the cooling compartment, means for conveying the food articles to the heating compartment from the cooling compartment, means associated with the cooling compartment for ejecting food articles from said supporting means and depositing the food articles on the conveying means, a motor-driven turntable mounted in the heating compartment and on which the food articles are deposited from the conveying means, means for conveying food articles from the housing and extending to the edge of said turntable, and movable means in the heating compartment for moving the food articles from said turntable to the last-mentioned conveying means for the food articles.

4. In a machine such as described, a housing including a cooling compartment and a heating compartment below the cooling compartment, refrigerating means associated with the cooling compartment, heating means associated with the heating compartment, an annular member rotatably supported in the cooling compartment for supporting a plurality of food articles arranged circumferentially thereof, a chute for conveying articles to the heating compartment from the cooling compartment, the annular member being rotatable to selectively position any of the food articles thereon adjacent the chute, means embraced by the annular member for ejecting the selected food article from the annular member and depositing the selected article on the chute, a motor-driven turntable mounted in the heating compartment and on which the selected article is deposited from the chute, a chute for conveying the selected article from the housing and extending to a point adjacent said turntable, and movable means in the heating compartment comprising a sweep member for moving the selected article from said turntable to the last-mentioned chute.

5. In a machine such as described, a housing including a cooling compartment and a heating compartment below the cooling compartment, refrigerating means associated with the cooling compartment, heating means associated with the heating compartment, an annular gravity-feed rack rotatably mounted in the cooling compartment and supporting a plurality of food articles arranged in columns disposed circumferentially thereof, a chute for conveying food articles to the heating compartment from the cooling compartment, said rack being rotatable to selectively position any column of food articles adjacent the chute, means embraced by the rack for ejecting the lowermost food article in the selected column from the rack and depositing the food article on the chute, a motor-driven turntable mounted in the heating compartment and on which the food article is deposited from the chute, a chute for conveying the food article from the housing and extending to a point adjacent said turntable, and movable means in the heating compartment comprising a sweep member for moving the food article from said turntable to the last-mentioned chute.

6. In a machine such as described, a housing including a cooling compartment and a heating compartment below the cooling compartment, refrigerating means associated with the cooling compartment, heating means associated with the heating compartment, an annular gravity-feed rack rotatably mounted in the cooling compartment and supporting a plurality of food articles arranged in columns disposed circumferentially thereof, a chute for conveying food articles to the heating compartment from the cooling compartment, said rack being rotatable to selectively position any column of food articles adjacent the chute, means embraced by the rack for ejecting the lowermost food article in the selected column from the rack and depositing the food article on the chute, a motor-driven turntable mounted in the heating compartment and on which the food article is deposited from the chute, a chute for conveying the food article from the housing and extending to a point adjacent said turntable, and movable means in the heating compartment comprising a sweep member for moving the food article from said turntable to the last-mentioned chute, the article-ejecting means in the cooling compartment comprising a horizontally disposed motor-driven cam shaft having an endless helical groove formed therein and also comprising an article-ejecting slide mounted for rectilinear and reciprocating movement, the latter having a finger extending into said groove.

7. In a machine such as described, a housing including a cooling compartment and a heating compartment below the cooling compartment, refrigerating means associated with the cooling compartment, heating means associated with the heating compartment, an annular gravity-feed rack rotatably supported in the cooling compartment and adapted to support a plurality of food articles arranged in columns disposed circumferentially thereof, a plate member supporting each article from below and directly supporting the next higher plate member, the plate members being slidable toward the bottom of the rack by gravity, a chute for conveying food articles to the heating compartment from the cooling compartment, the upper end of said chute being located radially outwardly of the rack and adjacent thereto, a chute for the article-supporting plate members extending to a point remote from said rack and having the upper end thereof disposed radially inwardly of the rack and adjacent thereto, said rack being rotatable to selectively position any column of food articles thereon between and adjacent the upper ends of said chutes, and means embraced by the rack for ejecting the lowermost food article and plate member therefor in the selected column, said means ejecting the food article and plate member therefor to the respective chutes.

8. In a machine such as described, a housing including a cooling compartment and a heating compartment below the cooling compartment, refrigerating means associated with the cooling compartment, heating means associated with the heating compartment, an annular gravity-feed rack rotatably supported in the cooling compartment and adapted to support a plurality of food articles arranged in columns disposed circumferentially thereof, a plate member supporting each article from below and directly supporting the next higher plate member, the plate members being slidable toward the bottom of the rack by gravity, a chute for conveying food articles to the heating compartment from the cooling compartment, the upper end of said chute being located radially outwardly of the rack and adjacent thereto, a chute for the article-supporting plate members extending to a point remote from said rack and having the upper end thereof disposed radially inwardly of the rack and adjacent thereto, said rack being rotatable to selectively position any column of food articles thereon between and adjacent the upper ends of said chutes, means embraced by the rack for ejecting the lowermost food article and plate member therefor in the selected column, said means ejecting the food article and plate member therefor to the respective chutes, a motor-driven turntable in the heating compartment rotatably mounted on a vertical shaft and on which the food article is deposited from the article chute, and movable means in the heating compartment comprising a sweep member for sweeping the food article from said turntable.

9. In a machine such as described, a housing including a cooling compartment and a heating compartment below the cooling compartment, refrigerating means associated with the cooling compartment, heating means associated with the heating compartment, an annular gravity-feed rack rotatably supported in the cooling compartment and adapted to support a plurality of food articles arranged in columns disposed circumferentially thereof, a plate member supporting each article from below and directly supporting the next higher plate member, the plate members being slidable toward the bottom of the rack by gravity, a chute for conveying food articles to the heating compartment from the cooling compartment, the upper end of said chute being located radially outwardly of the rack and adjacent thereto, a chute for the article-supporting plate members extending to a point remote from said rack and having the upper end thereof disposed radially inwardly of the rack and adjacent thereto, said rack being rotatable to selectively position any column of food articles thereon between and adjacent the upper ends of said chutes, means embraced by the rack for ejecting the lowermost food article and plate member therefor in the selected column, said means ejecting the food article and plate member therefor to the respective chutes, a motor-driven turntable in the heating compartment rotatably mounted on a vertical shaft and on which the food article is deposited from the article chute, and movable means in the heating compartment comprising a sweep member for sweeping the food article from said turntable, said last-mentioned means having an operative connection with said shaft.

10. In a machine such as described, a housing including a cooling compartment and a heating compartment below the cooling compartment, refrigerating means associated with the cooling compartment, heating means associated with the heating compartment, an annular gravity-feed rack rotatably supported in the cooling compartment and adapted to support a plurality of food articles arranged in columns disposed circumferentially thereof, a plate member supporting each article from below and directly supporting the next higher plate member, the plate members being slidable toward the bottom of the rack by gravity, a chute for conveying food articles from the cooling compartment to the heating compartment, the upper end of said chute being located radially outwardly of the rack and adjacent thereto, a chute for the article-supporting plate members extending to a point remote from said rack and having the upper end thereof disposed radially inwardly of the rack and adjacent thereto, said rack being rotatable to selectively position any column of food articles thereon between and adjacent the upper ends of said chutes, means embraced by the rack for ejecting the lowermost food article and plate member therefor in the selected column, said means ejecting the food article and plate member therefor to the respective chutes, a motor-driven turntable in the heating compartment rotatably mounted on a vertical shaft and on which the food article is deposited from the article chute, movable means in the heating compartment comprising a sweep member for sweeping the food article from said turntable, said last-mentioned means having an operative connection with said shaft, and a chute extending from the housing and having the upper end thereof disposed radially outwardly of the turntable and adjacent thereto, the food article being deposited on the last-mentioned chute by said sweep member.

11. In a machine such as described, a housing including a cooling compartment and a heating compartment below the cooling compartment, refrigerating means associated with the cooling compartment, heating means associated with the heating compartment, an annular gravity-feed rack rotatably mounted in the cooling compartment and supporting a plurality of food articles arranged in columns disposed circumferentially thereof, a chute for conveying food articles to the heating compartment from the cooling compartment, said rack being rotatable to selectively position any column of food articles adjacent the chute, means embraced by the rack for ejecting the lowermost food article in the selected column from the rack and depositing the food article on the chute, a motor-driven turntable mounted in the heating compartment and on which the food article is deposited from the chute, and means for ejecting the food article from the turntable, the article-ejecting means in the cooling compartment comprising a motor-driven slide mounted for reciprocating and rectilinear movement, said slide having a flanged end portion engageable with the lowermost food article in the selected column to eject the article from the rack and deposit the article on said chute.

12. In a machine such as described, a housing including a cooling compartment and a heating compartment below the cooling compartment, refrigerating means associated with the cooling compartment, heating means associated with the heating compartment, an annular gravity-feed rack rotatably supported in the cooling compartment and adapted to support a plurality of food articles arranged in columns disposed circumferentially thereof, plate members supporting the respective articles from below, the plate members being slidable toward the bottom of the rack by gravity, a chute extending from the cooling compartment toward the heating compartment, the upper end of said chute being located radially inwardly of the rack and adjacent thereto, a chute for the article-supporting plate members extending toward a collection chamber in the housing and having the upper end thereof disposed radially outwardly of the rack and adjacent thereto, said rack being rotatable to selectively position any column of food articles thereon between and adjacent the upper ends of said chutes, means associated with the cooling compartment for ejecting the lowermost food article and plate member therefor in the selected column, said means ejecting the food article and plate member therefor to the respective chutes, and means in the heating compartment to receive the article from the chute therefor and transport the article to an exit in the heating compartment, the last-named means including a motor-driven conveyor belt.

13. In a machine such as described, a housing including a cooling compartment and a heating compartment spaced below the cooling compartment, the bottom of the cooling compartment having an opening therein registering with an opening in the top of the heating compartment, refrigerating means associated with the cooling compartment, heating means associated with the heating compartment, an annular gravity-feed rack rotatably supported in the cooling compartment and adapted to support a plurality of food articles arranged in columns disposed circumferentially thereof, plate members supporting the respective food articles from below and each supporting the next higher plate member, the plate members being slidable toward the bottom of the rack by gravity, a chute for conveying the food articles to said compartment openings, the upper end of the chute being located radially inwardly of the rack and adjacent thereto, a chute for the article-supporting plate members extending toward a collection chamber in the housing and having the upper end thereof disposed radially outwardly of the rack and adjacent thereto, said rack being rotatable to selectively position any column of food articles thereon between and adjacent the upper ends of said chutes, means for ejecting the lowermost food article and plate member therefor in the selected column, the ejecting means comprising a motor-driven slide extending between said compartments and including a plate part normally closing said compartment openings, the slide having a rigid arm for reciprocating motion with the slide, the arm when moved in one direction with the slide being engageable with the lowermost article in the selected column to thrust the same on the article chute while, at substantially the same time, said plate part of the slide is moved to uncover the compartment openings so that the article on the chute may be delivered to the heating compartment, and the arm being provided with spring-pressed means engageable with means on the plate member to effect bodily movement of the plate member with the arm upon movement of the latter in the opposite direction, so that the plate member is deposited on the chute therefor.

References Cited in the file of this patent

UNITED STATES PATENTS

| | | |
|---|---|---|
| 2,093,138 | Risebeck | Sept. 14, 1937 |
| 2,103,367 | Hoban | Dec. 28, 1937 |
| 2,253,482 | Forsthoefel et al. | Aug. 19, 1941 |
| 2,337,117 | Lloyd | Dec. 21, 1943 |
| 2,531,238 | Tandler et al. | Nov. 21, 1950 |
| 2,578,951 | Shaver | Dec. 18, 1951 |
| 2,637,451 | Newell | May 5, 1953 |
| 2,643,169 | Wells et al. | June 23, 1953 |

FOREIGN PATENTS

| | | |
|---|---|---|
| 104,793 | Sweden | June 16, 1942 |

UNITED STATES PATENT OFFICE

CERTIFICATE OF CORRECTION

Patent No. 2,834,510                                                                   May 13, 1958

Lewis Cenotti

It is hereby certified that error appears in the above numbered patent requiring correction and that the said Letters Patent should read as corrected below.

In the grant, lines 2 and 3, for "assignor to The Pie-O-Matic Corporation, of North Haven, Connecticut, a corporation of Connecticut" read -- assignor of one-half to The Pie-O-Matic Corporation, of North Haven, Connecticut, a corporation of Connecticut --; line 12, for "The Pie-O-Matic Corporation, its successors" read -- Lewis Cenotti, his heirs, and The Pie-O-Matic Corporation, its successors --; in the heading to the printed specification, lines 3 to 5, for "assignor to The Pie-O-Matic Corporation, North Haven, Conn., a corporation of Connecticut" read -- assignor of one-half to The Pie-O-Matic Corporation, North Haven, Conn., a corporation of Connecticut.

Signed and sealed this 12th day of August 1958.

(SEAL)
Attest:

KARL H. AXLINE                                                        ROBERT C. WATSON
Attesting Officer                                                Commissioner of Patents